(12) United States Patent
Schäfer et al.

(10) Patent No.: US 11,695,173 B2
(45) Date of Patent: Jul. 4, 2023

(54) FLUID-TEMPERATURE-CONTROLLABLE TRACTION BATTERY AND BATTERY HOUSING ASSEMBLY HAVING A FEED-THROUGH FOR A HEAT TRANSMISSION DEVICE

(71) Applicant: Kautex Textron GmbH & Co. KG, Bonn (DE)

(72) Inventors: Guido Schäfer, Bornheim (DE); Moritz Lipperheide, Bonn (DE); Georg Enkirch, Salz (DE); Stefan Lenz, Bergisch-Gladbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 17/614,625

(22) PCT Filed: Apr. 15, 2020

(86) PCT No.: PCT/EP2020/060522
§ 371 (c)(1),
(2) Date: Nov. 29, 2021

(87) PCT Pub. No.: WO2020/239314
PCT Pub. Date: Dec. 3, 2020

(65) Prior Publication Data
US 2022/0231353 A1 Jul. 21, 2022

(30) Foreign Application Priority Data
May 29, 2019 (DE) .......................... 102019114445.0

(51) Int. Cl.
*H01M 10/6556* (2014.01)
*H01M 10/625* (2014.01)
(Continued)

(52) U.S. Cl.
CPC ..... *H01M 10/6556* (2015.04); *H01M 10/625* (2015.04); *H01M 50/204* (2021.01);
(Continued)

(58) Field of Classification Search
CPC ........... H01M 10/6556; H01M 10/625; H01M 2220/20
See application file for complete search history.

(56) References Cited

U.S. PATENT DOCUMENTS 5,735,555 A 4/1998 Answine et al.
2002/0145285 A1* 10/2002 Katayama ........... F16L 37/0987
285/423

(Continued)

FOREIGN PATENT DOCUMENTS

CH 649140 A5 4/1985
CN 102227846 A 10/2011
(Continued)

OTHER PUBLICATIONS

International Search Report, PCT Application No. PCT/EP2020/060522, dated Jul. 8, 2020 (3 pages).

*Primary Examiner* — Muhammad S Siddiquee
(74) *Attorney, Agent, or Firm* — Occhiuti & Rohlicek LLP (57) ABSTRACT

A battery housing arrangement, in particular a battery housing assembly of a vehicle traction battery which can be temperature-controlled by a fluid, comprises a battery housing which encloses an interior space for receiving battery cells, and a heat transmission device which has an inlet tube, an outlet tube and a heat exchanger element arranged fluidically therebetween. The fluid is able to flow through the heat transmission device from the inlet tube via the heat exchanger element to the outlet tube. The heat exchanger element can be accommodated in the battery housing. The battery housing has at least one through-opening for feeding (Continued)

through the inlet tube and the outlet tube, and the battery housing has at least one closure element which is inserted into the at least one through-opening and forms a closure between the inlet tube and/or the outlet tube and the at least one through-opening.

19 Claims, 3 Drawing Sheets

(51) Int. Cl.
*H01M 50/227* (2021.01)
*H01M 50/262* (2021.01)
*H01M 50/204* (2021.01)

(52) U.S. Cl.
CPC ....... *H01M 50/227* (2021.01); *H01M 50/262* (2021.01); *H01M 2220/20* (2013.01)

(56) References Cited

U.S. PATENT DOCUMENTS

| | | | |
|---|---|---|---|
| 2014/0023297 A1* | 1/2014 | Zund | F16L 37/05 251/149.6 |
| 2014/0193683 A1 | 7/2014 | Mardall et al. | |
| 2014/0272515 A1 | 9/2014 | Maguire et al. | |
| 2015/0200429 A1* | 7/2015 | Lee | H01M 10/613 429/120 |
| 2016/0248133 A1* | 8/2016 | Iqbal | H01M 10/6568 |
| 2017/0279169 A1 | 9/2017 | Obrist et al. | |
| 2017/0346052 A1* | 11/2017 | Weber | H01M 50/20 |
| 2018/0309176 A1 | 10/2018 | Moschet et al. | |

FOREIGN PATENT DOCUMENTS

| | | |
|---|---|---|
| CN | 104779422 A | 7/2015 |
| CN | 105027349 A | 11/2015 |
| CN | 107208822 A | 9/2017 |
| DE | 102013201129 A1 | 7/2014 |
| DE | 102014203917 A1 | 9/2015 |
| DE | 102016001145 A1 | 8/2017 |
| DE | 102017208617 A1 | 11/2018 |
| EP | 1580471 A2 | 9/2005 |
| EP | 2339688 A1 | 6/2011 |
| EP | 2693522 A1 | 2/2014 |
| JP | 2010163018 A | 7/2010 |
| JP | 2011065907 A | 3/2011 |
| JP | 2015141887 A | 8/2015 |
| JP | 2016072328 A | 5/2016 |
| WO | 2006128716 A1 | 12/2006 |
| WO | 2010025927 A2 | 3/2010 |
| WO | 2011088997 A1 | 7/2011 |
| WO | 2015197310 A2 | 12/2015 |
| WO | 2018215237 A1 | 11/2018 |

* cited by examiner

FLUID-TEMPERATURE-CONTROLLABLE TRACTION BATTERY AND BATTERY HOUSING ASSEMBLY HAVING A FEED-THROUGH FOR A HEAT TRANSMISSION DEVICE

CROSS REFERENCE TO RELATED APPLICATIONS

This application is a national phase under 35 U.S.C 371 of International Application No. PCT/EP2020/060522, filed Apr. 15, 2020, which claims priority to German Application No. DE 10 2019 114 445.0, filed May 29, 2019, the contents of which are incorporated herein in their entirety.

The present invention relates to a battery housing assembly, in particular a battery housing assembly for a vehicle traction battery which can be temperature-controlled by a fluid, comprising a battery housing which encloses an interior space for receiving a plurality of battery cells, and a heat transmission device having an inlet tube, an outlet tube and a heat exchanger element arranged fluidically therebetween, the fluid being able to flow through the heat transmission device from the inlet tube via the heat exchanger element to the outlet tube, it being possible for the heat exchanger element to be accommodated in the battery housing.

The present invention also relates to a traction battery which can be temperature-controlled by a fluid comprising the above-described battery housing assembly and a plurality of battery cells which are accommodated in the battery housing of the battery housing assembly.

The present invention also relates to a method for producing the above-mentioned battery housing assembly, in particular a battery housing assembly for a vehicle traction battery which can be temperature-controlled by a fluid.

Battery housing assemblies for traction batteries which can be temperature-controlled by a fluid and corresponding traction batteries which can be temperature-controlled by a fluid comprising battery housing assemblies of this kind are already known in various embodiments from the prior art. They have to meet a number of requirements. For example, the battery housings are intended to encase the battery cells and battery modules received therein in a crash-proof manner and shield them from the environment. Furthermore, the battery housings should allow a traction battery to be manufactured cost-effectively and should be designed to make it simple to service the battery modules received in the battery housing.

Fluids, i.e. gases or, preferably, liquids, are typically used to control the temperature of traction batteries. Heat can be transferred from the fluid to the battery cells, or vice versa. Alternatively, a cooling circuit can be provided in which the fluid changes its state of matter in order to absorb heat for evaporation of a liquid fluid or to give off heat during condensation of a gaseous fluid. This allows particularly efficient temperature control of the traction battery. Correspondingly, the traction battery can be cooled at high temperatures or when heated during operation, or it can be heated, for example, at low ambient temperatures.

In the prior art, these traction batteries which can be temperature-controlled by a fluid and battery housing assemblies for traction batteries of this kind usually comprise a battery housing made of metal. Known battery housings for traction batteries are made from welded or pressed sheet steel or cast aluminum, for example. In order to install the heat transmission device and in order feed through an inlet and an outlet, the battery housings have connection flanges, for example. On the inside of the battery housing the heat transmission device is connected by its inlet and by its outlet to the connection flanges, and on the outside of the battery housing connecting tubes of a temperature-control circuit are connected to the connection flanges. This requires a complex production process for the battery housing with the connection flanges. For this purpose, finely machined surfaces are required on the battery housing, for example, which can typically only be achieved with machining. A seal can be made via screw connections on the battery housing. Production of this kind of battery housing is very complex and costly. Threaded screw connections required for connection to the inlet and outlet of the heat transmission device as well as for connection of the connecting tubes of the temperature-control circuit increase the installation workload and are also associated with high costs. In addition, the installation and connection of the heat transmission device within the battery housing can be very difficult to carry out if, for example, the connection flange is difficult to access within the battery housing. This complicates the manufacture of such battery housing assemblies and traction batteries that can be temperature-controlled by a fluid.

Plastics or composite materials are increasingly being used for the production of such battery housings, since they are lighter than metals, for example. However, the above-mentioned feed-throughs are mostly unsuitable for battery housings made of plastics material or a composite material.

Proceeding from this, the object of the present invention is to provide a battery housing assembly, a traction battery which can be temperature-controlled by a fluid comprising a battery housing assembly of this kind and a method for producing such a battery housing assembly, which allows for simple assembly and provision of a battery housing assembly and a traction battery having compact dimensions, high stability and which allows for good protection against environmental influences and the ingress of dirt.

The object of the present invention is solved by a battery housing assembly having the features of claim 1. Advantageous embodiments of the battery housing assembly are described in the claims dependent on claim 1.

More precisely, the object of the present invention is achieved by a battery housing assembly, in particular a battery housing assembly for a vehicle traction battery which can be temperature-controlled by a fluid, comprising a battery housing which encloses an interior space for receiving a plurality of battery cells, and a heat transmission device having an inlet tube, an outlet tube and a heat exchanger element arranged fluidically therebetween, the fluid being able to flow through the heat transmission device from the inlet tube via the heat exchanger element to the outlet tube, it being possible for the heat exchanger element to be accommodated in the battery housing.

The battery housing assembly according to the invention is characterized in that the battery housing has at least one through-opening for feeding through the inlet tube and the outlet tube, and the battery housing has at least one closure element which is inserted into the at least one through-opening and forms a closure between the inlet tube and/or the outlet tube and the at least one through-opening.

The battery housing assembly according to the invention and the traction battery that can be temperature-controlled by a fluid allow for the fluid for controlling the temperature of the battery cells of the traction battery to be fed through a wall of the battery housing in a simple manner. In addition, there are various advantages when installing the heat transmission device in the battery housing and also when using the battery housing assembly and the traction battery which can be temperature-controlled by a fluid. For example, a connection flange in the wall of the battery housing can be dispensed with, since the inlet tube and the outlet tube are led out of the battery housing. As a result, handling of the battery housing is simplified. Threaded screw connections required for connecting the heat transmission device, as well as the connection tubes of the temperature-control circuit in the case of a flange connection, can also be dispensed with. Threaded screw connections of this kind increase the assembly effort and are also associated with high costs. Furthermore, only a small amount of assembly or installation space is required in the battery housing, since no connections to the inlet tube or the outlet tube have to be made within the battery housing. Connections of the inlet tube and the outlet tube are outside of the battery housing. Outside the battery housing, the two tubes can usually be easily connected to connection tubes of the temperature-control circuit. Overall, this allows for simplified installation of the heat transmission device on or in the battery housing and simple connection of the heat transmission device to the temperature-control circuit for controlling the temperature of the traction battery of the vehicle. By feeding the inlet tube and the outlet tube through the through-opening, the positioning of the heat transmission device in or on the battery housing is simplified.

The closure of the battery housing by means of the at least one closure element not only provides protection against the ingress of dirt or moisture into the battery housing. In addition, the at least one closure element forms a type of "floating mounting" of the inlet tube and/or the outlet tube in the through-opening of the battery housing. In principle, this relates to an axial direction of the relevant inlet tube or outlet tube, which is also referred to below as the passage direction. Alternatively or additionally, a floating mounting in the radial direction of the relevant inlet tube or outlet tube can be used. In this way, tolerances between the battery housing and the inlet tube or outlet tube can be compensated for. For example, different coefficients of thermal expansion of the battery housing and of the heat transmission device can be compensated for if they are made from different materials. Since the heat transmission device is not held directly on the battery housing, tolerances during installation of the heat transmission device in the battery housing can also be easily compensated for. Furthermore, the heat transmission device having the inlet tube, the outlet tube and the heat exchanger element can be provided as a unit for connection to the temperature-control circuit, which improves reliability and resistance to failure and reduces potential leaks by eliminating internal connections. External forces also act directly on the inlet tube and the outlet tube, and therefore damage to the battery housing can be prevented. Any damage to the closure element that occurs in spite of this can be eliminated simply by replacing the closure element.

The vehicle can be any vehicle with an electric drive, for example a purely electrically operated vehicle or a so-called hybrid vehicle with an electric drive and an additional drive, e.g. an internal combustion engine. The number and arrangement of electric drive motors in the vehicle is irrelevant to the present invention.

The battery housing can be designed in different ways. For example, the battery housing can be designed in two parts with a lower shell and an upper shell, such that the battery housing can be closed after the battery cells have been inserted, in that the upper shell is preferably placed on the lower shell. In this case, the battery housing can be opened by removing the upper shell in order to allow access to the battery cells. In principle, the reverse is also possible.

The heat transmission device comprises the inlet tube and the outlet tube, between which the fluid circulates through the heat exchanger element. The heat exchanger element serves to absorb heat from the battery cells or to give off heat thereto, depending on an operation of the heat transmission device. The operation for absorbing or releasing heat can be set by appropriately supplying the fluid with a corresponding starting temperature. As a result, the temperature of the battery cells can be controlled in order to allow optimal operation and to make their maximum storage capacity available. In principle, a plurality of heat transmission devices can also be arranged in the battery housing in the manner described. The heat transmission device can also be used exclusively for cooling or heating the battery cells, such that a particularly simple temperature-control circuit can be used. At the same time, homogeneous temperature distribution of the battery cells can be achieved by means of the heat transmission device.

The fluid can be a gas or, preferably, a liquid having a high heat capacity. The heat can be transmitted from the fluid via the heat exchanger element to the battery cells or vice versa. Alternatively, a cooling circuit can be provided in which the fluid changes its state of matter in order to absorb heat for evaporation or to give off heat during condensation. This allows particularly efficient temperature control of the battery cells.

The heat exchanger element is arranged in the interior of the battery housing in order to transmit heat to the battery cells or to absorb heat from the battery cells. For this purpose, a contact element can be arranged between the battery cells and the heat exchanger element. The contact element is in thermal contact with the heat exchanger element and the battery cells. The contact element is typically made of a metal with high thermal conductivity, preferably aluminum. The heat exchanger element can comprise one or more tubular fluid channels. Particularly preferably, the at least one fluid channel has a rectangular cross section, such that the walls of the fluid channel can be thermally contacted in an effective manner. The at least one fluid channel is typically made of a metal with high thermal conductivity, preferably aluminum. A plurality of fluid channels can in principle be connected in parallel and/or in rows in any desired manner. A fluid channel or a plurality of fluid channels can be designed or arranged together in a meandering shape. A plurality of fluid channels can be arranged individually and connected to one another to form the heat exchanger element, or preferably form the heat exchanger element as a mechanically rigidly connected unit.

The heat transmission device having the heat exchanger element is preferably positioned on a bottom face of the battery housing, such that the heat exchanger element can be supported on the bottom face.

The at least one through-opening for feeding through the inlet tube and the outlet tube can in principle have any shape, a circular or oval design being preferred and facilitating the closure of the battery housing with the closure element.

The at least one closure element preferably has a certain resilience, which facilitates insertion into the through-opening when the inlet tube and/or outlet tube are fed through. The closure element seals the battery housing against the ingress of foreign bodies and moisture. In addition, the closure element preferably brings about thermal sealing of the battery housing. In another preferred embodiment, the closure element produces pressure-tight sealing of the battery housing.

The feeding-through of the inlet tube and the outlet tube relates to threading the two tubes into the one or more through-openings. It is not necessary for the inlet tube or the outlet tube to be fed through the relevant through-opening completely. The inlet tube and the outlet tube are fed through in that both the inlet tube and the outlet tube can be connected outside the battery housing, for example to the temperature-control circuit already mentioned above.

In an advantageous embodiment, the battery housing has a through-opening for jointly feeding through the inlet tube and the outlet tube, and the battery housing has a closure element which is inserted into the through-opening and forms a closure between the inlet tube and/or the outlet tube and the through-opening. The inlet tube and the outlet tube can be arranged separately in the through-opening, such that the closure element forms a closure between each of the two tubes and the through-opening. Alternatively, the inlet tube and the outlet tube can form a structural unit. The inlet tube and the outlet tube can be arranged next to one another, for example. Alternatively, the inlet tube and the outlet tube can be designed coaxially, with the inlet tube surrounding the outlet tube or vice versa. In this case, the closure element forms a closure between the outer of the two tubes and the through-opening.

In an advantageous embodiment, the battery housing has a plurality of through-openings for feeding through the inlet tube and the outlet tube, and the battery housing has a plurality of closure elements which are inserted into one through-opening in each case and form a closure between the inlet tube and a through-opening and between the outlet tube and a through-opening. Each of the tubes is thus fed individually through a through-opening, and each of the through-openings is closed with a closure element. In principle, a plurality of inlet tubes and a plurality of outlet tubes can also be fed through a corresponding plurality of through-openings. The plurality of inlet tubes and outlet tubes may be part of only one heat transmission device. Alternatively, the battery housing assembly can comprise a plurality of heat transmission devices, each having an inlet tube and an outlet tube, which are each fed individually through a through-opening. In addition, combinations of inlet tubes and/or outlet tubes in a through-opening are also possible, for example a through-opening through which two inlet tubes are fed, together with a through-opening through which two outlet tubes are fed. The above statements with regard to the joint feeding of the inlet tube and outlet tube through a through-opening apply accordingly.

In an advantageous embodiment, the plurality of through-openings for feeding through the inlet tube and the outlet tube are arranged on one side of the battery housing, and the inlet tube and the outlet tube extend on the same side with respect to the heat exchanger element, such that the inlet tube and the outlet tube can be passed through the plurality of through-openings together. The heat transmission device can thus be easily positioned in the battery housing. An axial movement of the heat transmission device enables the inlet tube and outlet tube to be fed through the through-openings. The axial movement of the heat transmission device can be combined with a pivoting movement, for example.

In an advantageous embodiment, the at least one through-opening is designed as a tubular through-opening, and the at least one closure element is designed as a cylindrical closure element. The tubular through-opening therefore has an axial extension into which the closure element can be inserted, as a result of which sealing of the battery housing is facilitated. The closure element correspondingly forms a cylindrical plug for closing the through-opening over at least one axial subregion of the through-opening. In principle, any corresponding cross sections of tubular through-openings and cylindrical closure elements are possible, for example circular, oval, rectangular or also freely definable cross sections.

In an advantageous embodiment, the at least one closure element is designed as a plastically and/or elastically deformable closure element, the at least one closure element being deformable in the axial direction relative to a passage direction of the inlet tube and/or the outlet tube, and/or the at least one closure element being deformable in the radial direction relative to a passage direction of the inlet tube and/or the outlet tube. The at least one closure element is preferably designed to be rubber-elastic. Due to the deformability of the at least one closure element, it can easily be inserted into the through-opening and reliably close it. Tolerances that arise during manufacture, assembly or operation can easily be compensated for. An elastic deformation of the at least one closure element is particularly advantageous in order to use the closure element multiple times to close the through-opening. The at least one closure element is preferably made from polypropylene (PP), ethylene-propylene-diene monomer (EPDM) or a combination thereof.

In an advantageous embodiment, the at least one closure element has an inner ring element for resting on the inlet tube and/or the outlet tube and an outer ring element for resting on the through-opening, and the inner ring element and the outer ring element are connected to one another via an in particular V-shaped connecting element. The outer ring element allows for a reliable sealing effect at the through-opening, while the inner ring element allows for a reliable sealing effect at the inlet tube and/or the outlet tube. The sealing effect can be produced over an axial region of the ring elements, such that local damage to the relevant ring element cannot negate the sealing effect as a whole. The ring elements allow the closure element to be reliably secured in the through-opening or on the inlet tube and/or the outlet tube. On account of a V-shaped design of the connecting element, the two ring elements can be moved relative to one another both in the radial direction and in the axial direction, such that tolerances can be easily compensated by means of the closure element. The inner and outer ring elements preferably have a higher strength than the connecting element. Correspondingly, the connecting element has a higher resilience than the ring elements. This further simplifies the compensation of tolerances, while the ring elements, due to their higher strength, can be reliably positioned in the through-opening or on the inlet tube and/or the outlet tube. Inner and outer ring elements are preferably arranged concentrically. The closure element is particularly preferably designed having two components, particularly preferably as a two-component injection-molded part. As a result, different properties of the ring elements and the connecting element can be easily implemented, and the closure element is easy to manufacture.

In an advantageous embodiment, corresponding locking elements are formed on the at least one through-opening and the at least one closure element in order to lock the at least one closure element in the at least one through-opening; and/or corresponding locking elements are formed on the at least one closure element and the inlet tube and/or the outlet tube in order to lock the at least one closure element on the inlet tube and/or the outlet tube. The locking elements allow for a reliable installation of the closure element in the through-opening or on the inlet tube and/or the outlet tube, such that reliable closure of the battery housing can be achieved. The corresponding locking elements are preferably designed in such a way that the locking can be canceled, for example in order to be able to simply remove the closure element from the corresponding through-opening. The corresponding locking elements are designed, for example, having an engagement element and a recess. The corresponding locking elements are preferably designed to effect interlocking or to produce a clip connection. The production of the latching or of the clip connection allows for acoustic monitoring of the installation of the at least one closure element. The locking elements are preferably arranged on the outside of the battery housing such that they are easily accessible. This makes it possible for a simple check of the correct installation of the relevant closure element to take place, for example by means of an optical or haptic check. In a preferred embodiment, the corresponding locking elements are designed having a manual unlocking function, for example via an operating surface.

In an advantageous embodiment, a sealing element is arranged between the at least one through-opening and the at least one closure element, and is preferably positioned in an annular groove of the closure element, and/or a sealing element is arranged between the at least one closure element and the inlet tube and/or the outlet tube, and is preferably positioned in an annular groove of the inlet tube and/or the outlet tube. The sealing element in each case produces particularly reliable sealing of the closure element on the at least one through-opening or on the inlet tube and/or the outlet tube. As a result, the closed battery housing is reliably protected against the ingress of moisture, for example. Accommodating the relevant sealing element in the annular groove allows for reliable positioning of the sealing element. A plurality of sealing elements are preferably arranged between the at least one through-opening and the at least one closure element and/or between the at least one closure element and the inlet tube and/or the outlet tube. The plurality of sealing elements are particularly preferably arranged so as to be spaced apart in the axial direction. In a another, preferred embodiment, the closure element is integrally with formed the relevant sealing element. The closure element is particularly preferably designed as a two-component injection-molded component, such that the closure element itself can have different properties to the sealing element, in particular in the region of the sealing element. In particular, the relevant sealing element may have a high degree of resilience in order to achieve a good seal.

In an advantageous embodiment, the battery housing is designed as a plastics housing. As a result, the battery housing can be made light in weight. The battery housing is preferably produced in an injection-molding process. The battery housing can be made in one piece or with multiple separate parts. By simply fitting the heat exchanger element in the battery housing, a housing shape that is easy to manufacture can be achieved. In this case, for example, undercuts can be dispensed with. Overall, this allows for the production of the battery housing using tools with the lowest possible tool complexity. Alternatively, the battery housing can be made of metal or a composite material, for example.

In an advantageous embodiment, the battery housing is designed in two parts with an upper shell and a lower shell, the at least one through-opening preferably being formed in the lower shell. Providing the battery housing with an upper shell and a lower shell allows for simple assembly of the traction battery in that the heat transmission device and the battery cells are first installed in or on the lower shell. The battery housing can then be closed by putting on the upper shell. The upper shell serves as a lid. By removing the upper shell, the heat transmission device and the battery cells can be easily accessed for replacement or maintenance purposes.

In an advantageous embodiment, the heat transmission device is designed as a whole as a rigid unit, as a result of which interfaces or flexible tube portions within the heat transmission device are prevented. Dispensing with interfaces and flexible tube portions increases reliability and resistance to failure and reduces the risk of potential leaks.

In an advantageous embodiment, the heat transmission device is also made in one piece. This improves resistance to failure and reduces the risk of potential leaks.

The object of the present invention is also achieved by a traction battery which can be temperature-controlled by a fluid having the features of claim 14.

More specifically, the object according to the invention is thus also achieved by a traction battery which can be temperature-controlled by a fluid comprising an above-mentioned battery housing assembly and a plurality of battery cells which are accommodated in the battery housing of the battery housing assembly.

The above statements with regard to advantages and embodiments of the battery housing assembly also apply, mutatis mutandis, to the traction battery that can be temperature-controlled by a fluid and comprises said battery housing assembly.

The object of the present invention is also achieved by a method for producing a battery housing assembly having the features of claim 15.

Advantageous embodiments of the method are described in the claims dependent on claim 13.

The object according to the invention is thus also achieved by a method for producing a battery housing assembly, in particular a battery housing assembly of a vehicle traction battery which can be temperature-controlled by a fluid, comprising the steps of providing a battery housing which encloses an interior space for receiving a plurality of battery cells; positioning a heat transmission device, which has an inlet tube, an outlet tube and a heat exchanger element arranged fluidically therebetween, the fluid being able to flow through the heat transmission device from the inlet tube via the heat exchanger element to the outlet tube, in the interior space of the battery housing; feeding the inlet tube and the outlet tube through the at least one through-opening from inside the battery housing; and closing the battery housing by means of at least one closure element which forms a closure between the inlet tube and/or the outlet tube and the at least one through-opening.

The above statements with regard to advantages and embodiments of the traction battery that can be temperature-controlled by a fluid and the battery housing assembly can be achieved accordingly with the method for producing a battery housing assembly of this kind.

The method according to the invention allows for simple installation of the heat transmission device in that the inlet and outlet tubes are fed ("threaded") through the at least through-opening, such that the heat exchanger element can be easily and conveniently positioned in the battery housing. The connection of the heat transmission device, for example to the temperature-control circuit of the traction battery of the vehicle, can take place after the final positioning, in particular from the outside of the battery housing. This facilitates simple, fault-free and stress-free installation and connection of the heat exchanger element and the heat transmission device as a whole.

In the method, the steps for positioning the heat transmission device and for feeding the inlet tube and the outlet tube through the at least one through-opening, in particular, can take place in any order. The positioning of the heat transmission device and the feed-through of the inlet tube and the outlet tube can also take place in a common step or in a sequence of a plurality of alternating substeps.

In an advantageous embodiment, closing the battery housing by means of at least one closure element includes sliding the at least one closure element onto the inlet tube and/or the outlet tube and inserting the at least one closure element into the at least one through-opening from outside the battery housing on the inlet tube and/or the outlet tube. The closure of the through-opening is therefore independent of the positioning and even of the installation and/or connection of the heat transmission device. For example, the closure element can initially be pushed onto the inlet tube and/or the outlet tube and only pushed into the through-opening at a later point in time once on the inlet tube and/or the outlet tube in order to close said through-opening. Accordingly, the inlet tube and/or the outlet tube can also initially be connected to a temperature-control circuit, and the at least one through-opening can then be closed with the at least one closure element.

In an advantageous embodiment, feeding the inlet tube and the outlet tube through the at least one through-opening from inside the battery housing includes adjusting the heat transmission device such that the inlet tube and the outlet tube are arranged at an angle to a passage direction of the at least one through-opening, and pivoting the heat transmission device into its end position, the inlet tube and the outlet tube in the end position being arranged parallel to the passage direction in the at least one through-opening. As a result, the heat exchanger element can have dimensions which approximately correspond to those of the battery housing, for example on its base wall, and nevertheless can be positioned and installed easily and conveniently.

Further advantages, details, and features of the invention are apparent from the embodiment explained below. The drawings show, in detail, the following.

In the following description, the same reference signs denote the same components or features; in the interest of avoiding repetition, a description of a component made with reference to one figure also applies to the other figures.

FIGS. 1 to 6 relate to a battery housing assembly 1 according to a first, preferred embodiment. The battery housing assembly 1 is part of a vehicle traction battery which can be temperature-controlled by a fluid.

Figure 1:
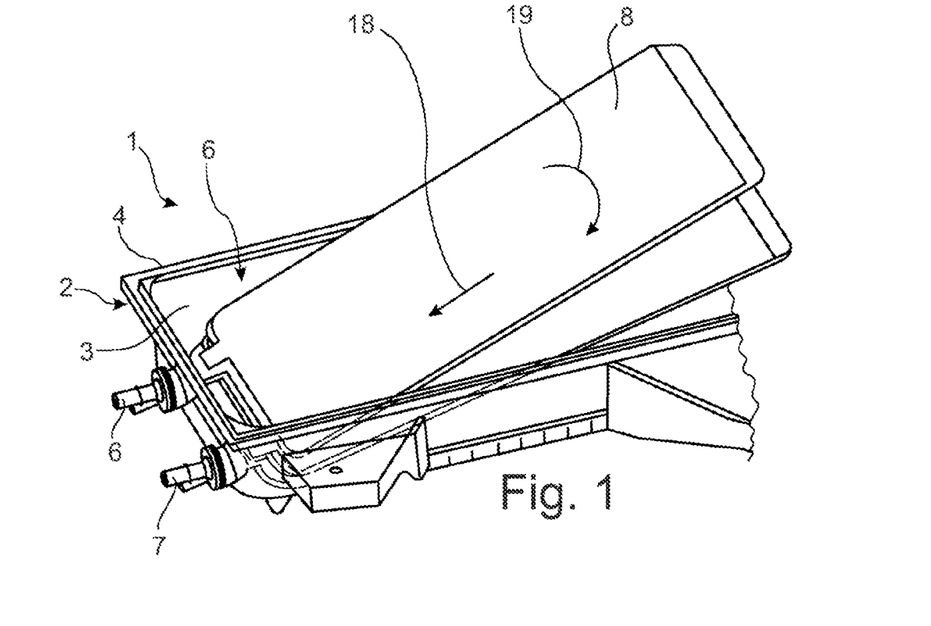
FIG. 1: a three-dimensional representation of a battery housing assembly according to the invention of a vehicle traction battery which can be temperature-controlled by a fluid, with a lower shell of a battery housing and a heat transmission device according to a first, preferred embodiment of the present invention.

The battery housing assembly 1 comprises a battery housing 2 which encloses an interior space 3 for receiving a plurality of battery cells (not shown here) for forming the traction battery that can be temperature-controlled by a fluid. The battery housing 2 is designed in two parts with a lower shell 4 and an upper shell (likewise not shown here), which is placed on the lower shell 4 in order to close the interior space 3. In this embodiment, the battery housing 2 is designed as a plastics housing and is manufactured in an injection-molding process. The upper shell and the lower shell 4 are produced as separate parts. Alternatively, the battery housing 2 can be made of metal or a composite material, for example.

The battery housing assembly 1 also comprises a heat transmission device 5, which has an inlet tube 6, an outlet tube 7 and a heat exchanger element 8 arranged fluidically therebetween. A fluid can flow through the heat transmission device 5 from the inlet tube 6 via the heat exchanger element 8 to the outlet tube 7. In the fully assembled state, the heat exchanger element 8 is received in the interior space 3 of the battery housing 2. The heat transmission device 5 with the heat exchanger element 8 is designed to be positioned on a bottom face of the battery housing 2 within the lower shell 4. In this position, the heat exchanger element 8 is supported on the inside on the lower shell 4.

The heat exchanger element 8 is used to absorb heat from the battery cells or to give off heat thereto, depending on an operation of the heat transmission device 5 for cooling or heating the battery cells. The heat exchanger element 8 comprises one or more tubular fluid channels, which preferably have a rectangular cross section. The fluid channel or the fluid channels are typically made of a metal with a high thermal conductivity, preferably aluminum. A plurality of fluid channels can in principle be connected in parallel and/or in rows in any desired manner. A fluid channel or a plurality of fluid channels can be designed or arranged together in a meandering shape. A plurality of fluid channels are preferably designed as a mechanically rigidly connected unit so as to form the heat exchanger element 8. The operation for absorbing or releasing heat can be set by appropriately supplying the fluid at a corresponding temperature.

In addition, the heat transmission device 5 having the heat exchanger element 8, the inlet tube 6 and the outlet tube 7 is designed as a whole as a rigid unit. In addition, the heat transmission device 5 is made in one piece in this embodiment.

In this case, the inlet tube 6 and the outlet tube 7 extend on the same side with respect to the heat exchanger element 8.

The fluid can be a gas or, preferably, a liquid. The heat can be transmitted from the fluid via the heat exchanger element 8 to the battery cells or vice versa. Alternatively, a cooling circuit can be provided in which the fluid changes its state of matter in order to absorb heat for evaporation or to give off heat during condensation.

Figure 2:
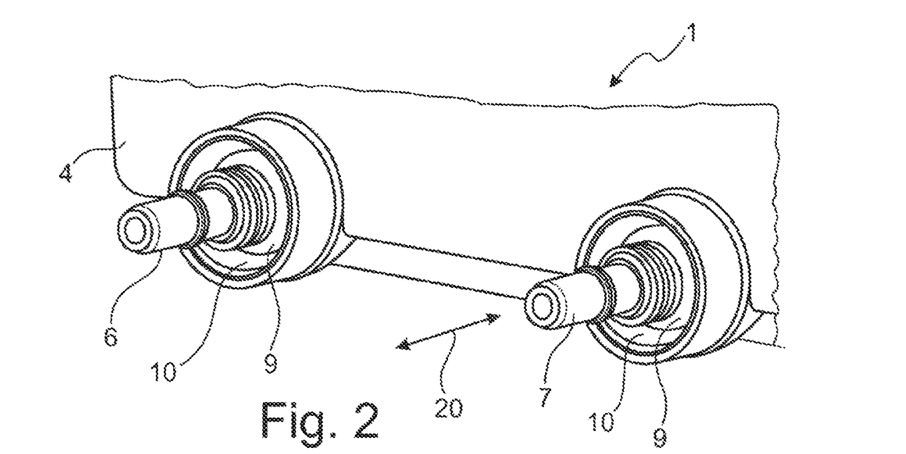
FIG. 2: a three-dimensional representation of a subregion of the base part from FIG. 1 with through-openings and the inlet tube and outlet tube of the heat transmission device from FIG. 1 arranged therein, as well as closure elements arranged between the inlet tube or the outlet tube and the corresponding through-opening.

The battery housing 5 has two through-openings 9 for the passage of the inlet tube 6 and the outlet tube 7. The through-openings 9 are formed in the lower shell 8. The two through-openings 9 are designed as tubular through-openings 9 with a circular shape. The two tubular through-openings 9 thus each have an axial extension. More specifically, the two through-openings 9 for feeding through the inlet tube 6 and the outlet tube 7 are arranged on the same side of the battery housing 2. Outside the battery housing 2, a connection between the heat transmission device 5 and connection tubes (not shown here) of the temperature-control circuit can be established in a simple manner. For this purpose, the inlet tube 6 and the outlet tube 7 are correspondingly connected to the connection of the temperature-control circuit.

As shown in FIG. 2, the battery housing 2 has two closure elements 10 which are inserted into the two through-openings 9 and form a closure between the inlet tube 6 or the outlet tube 7 and one of the through-openings 9 in each case. Each of the tubes 6, 7 is thus fed individually through a through-opening 9, and each of the through-openings 9 is closed with a closure element 10. The closure elements 10 seal the battery housing 2 against the ingress of foreign bodies and moisture.

Figure 3:
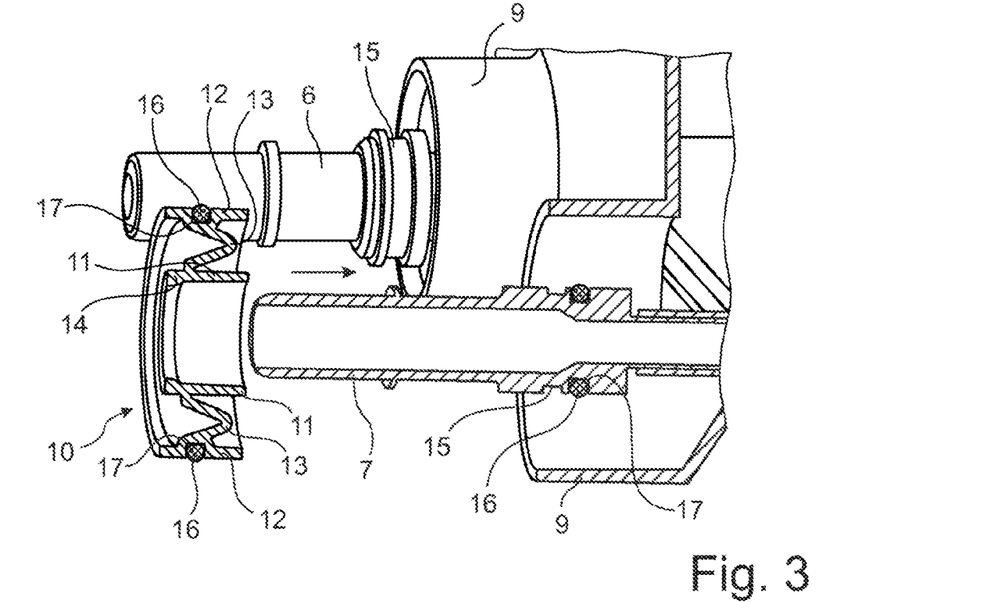
FIG. 3: a three-dimensional representation of a subregion of the base part from FIG. 1, with a section through the through-opening of the outlet tube and with the closure element when not inserted into the through-opening.
Figure 4:
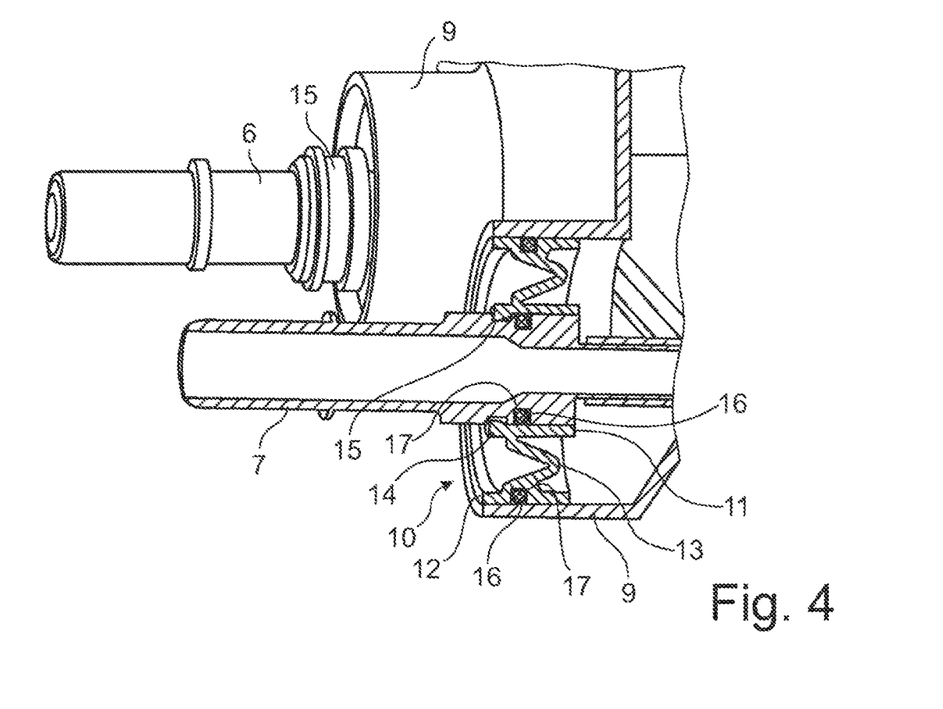
FIG. 4: a three-dimensional representation of a subregion of the base part in accordance with FIG. 3, the closure element having been inserted into the through-opening of the outlet tube, unlike in FIG. 3.
Figure 5:
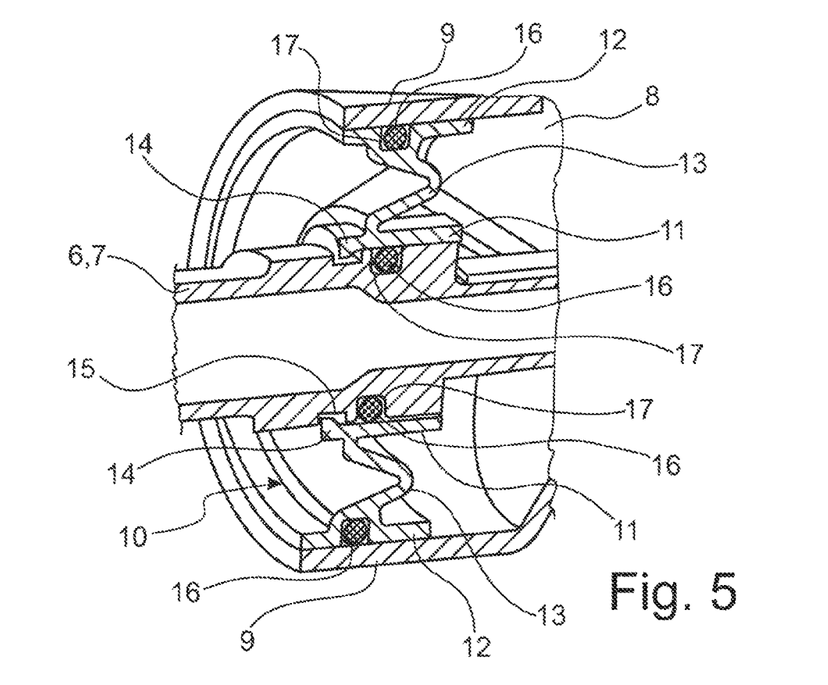
FIG. 5: a three-dimensional detailed view of the through-opening of the outlet tube with the closure element inserted therein in accordance with FIG. 4 and with a horizontal section.

As can be seen from FIGS. 3 to 5, each of the closure elements 10 has an inner ring element 11 for resting on the inlet tube 6 and the outlet tube 7. In addition, each of the closure elements 10 has an outer ring element 12 for contact with the relevant through-opening 9. The inner ring element 11 and the outer ring element 12 are connected to one another via a V-shaped connecting element 13. The outer ring element 12 is arranged coaxially with the inner ring element 11.

On account of the ring elements 11, 12, the closure elements 10 have a cylindrical shape such that they can be inserted into the tubular through-openings 9 in order to reliably close them. The closure elements 10 thus form cylindrical plugs for closing the relevant through-opening 9.

In this embodiment, the closure elements 10 are designed as two-component injection-molded components and are made from polypropylene (PP), ethylene-propylene-diene monomer (EPDM) or a combination thereof. By using two different components, the inner and outer ring elements 11, 12 have a higher strength than the connecting element 13. Accordingly, the connecting element 13 has a higher resilience than the ring elements 11, 12. As a result, the closure elements 10 overall have a specific resilience which facilitates insertion into the through-openings 9 when the inlet tube 6 or outlet tube 7 is fed through. The closure elements 10 are plastically and/or elastically deformable. The deformability is produced in the axial direction in relation to a passage direction 20 of the inlet tube 6 or of the outlet tube 7 and in the radial direction in relation to the passage direction 20.

Figure 6:
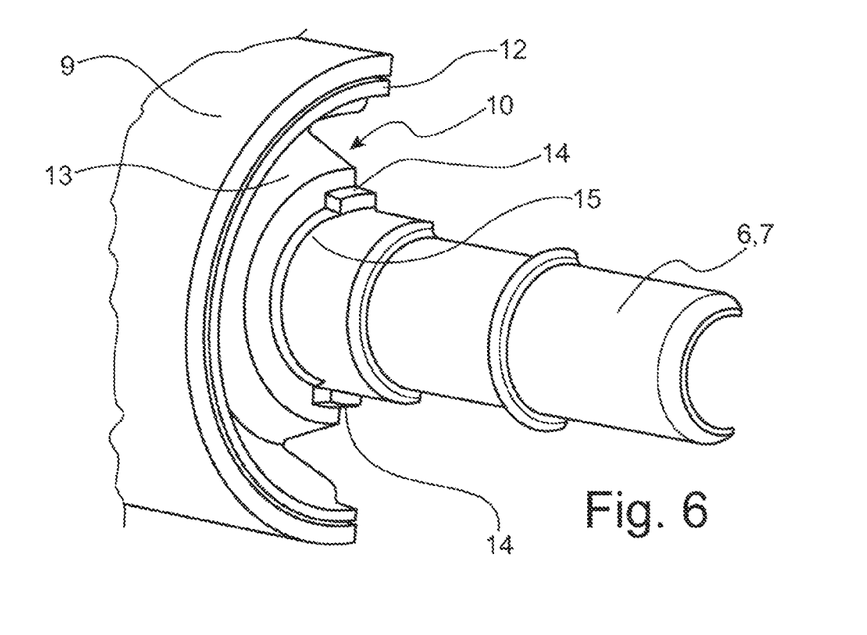
FIG. 6: a three-dimensional detailed view of the through-opening of the outlet tube with the closure element inserted therein in accordance with FIG. 5, but from an opposite side.

As shown in particular in FIG. 6, corresponding locking elements 14, 15 are formed on the inner ring elements 11 of the closure elements 10 and the inlet tube 6 as well as the outlet tube 7 in order to lock the closure elements 10 on the inlet tube 6 and the outlet tube 7. In this embodiment, the corresponding locking elements 14, 15 are designed having an engagement element 14, which is formed on the inner ring element 11 of the closure element 10, and a recess 15, which is formed in the inlet tube 6 and the outlet tube 7. The locking elements 14, 15 are arranged on the outside of the battery housing 2.

The corresponding locking elements 14, 15 cause an interlocking latching between the relevant closure element 10 and the inlet tube 6 or the outlet tube 7. The corresponding locking elements 14, 15 are designed in such a way that when the latching is established, acoustic feedback is provided for checking the assembly of the relevant closure element 10 on the inlet tube 6 or outlet tube 7. In addition, the corresponding locking elements 14, 15 are designed in such a way that the locking can be canceled. For this purpose, only the engagement element 14 has to be removed from the recess 15.

As can also be seen in FIGS. 3 to 5, a sealing element 16 is arranged between each of the through-openings 9 and the relevant closure element 10 and is positioned in an annular groove 17 of the closure element 10. More specifically, the annular groove 17 of the closure element 10 is arranged in the outer annular element 12. The sealing element 16 is designed as a sealing ring and is positioned in the annular groove 17 in the outer ring element 12.

As can be seen again in FIGS. 3 to 5, a sealing element 16 is also arranged between each of the closure elements 10 and the inlet tube 6 or the outlet tube 7, and is positioned in an annular groove 17 of the inlet tube 6 and of the outlet tube 7. The sealing element 16 is designed as a sealing ring and is positioned in the annular groove 17 of the inlet tube 6 and of the outlet tube 7. The sealing elements 16 have a high resilience in order to achieve a good seal between the closure element 10 and the through-opening 9 and between the closure element 10 and the inlet tube 6 or the outlet tube 7.

A method for producing the battery housing assembly 1 described above will be described in detail below.

The method begins with providing the battery housing 2 for receiving the plurality of battery cells in the enclosed interior space 3.

The heat transmission device 5 is then positioned in the interior space 3 of the battery housing 2. As shown in FIG. 1, the heat transmission device 5 is initially positioned at an angle in the battery housing 2. As a result, the inlet tube 6 and the outlet tube 7 are arranged at an angle to the passage direction 20 of the two through-openings 9.

Subsequently, the inlet tube 6 and the outlet tube 7 are fed through the two through-openings 9 from inside the battery housing 2. For this purpose, the heat transmission device 5 is moved out of the engaged position in the sliding direction 18 in such a way that the inlet tube 6 and the outlet tube 7 are jointly inserted into the two through-openings 9 and fed through.

Subsequently, the heat transmission device 5 is pivoted along the pivoting direction 19 into its end position, in which the inlet tube 6 and the outlet tube 7 are arranged parallel to the passage direction 20 in the through-openings 9. In addition, the heat transmission device 5 with the inlet tube 6 and the outlet tube 7 can be fed further through the through-openings 9 in the sliding direction 18. In the end position, the heat exchanger element 8 is positioned on the bottom face of the battery housing 2, such that the heat exchanger element 8 is supported on the bottom face. The state reached in this manner is shown in FIG. 3.

Finally, the battery housing 2 is closed with the two closure elements 10. A seal is formed between the inlet tube 6 or the outlet tube 7 and the relevant through-opening 9. For this purpose, the two closure elements 10 are pushed onto the inlet tube 6 or the outlet tube 7 accordingly and pushed along the inlet tube 6 or the outlet tube 7 from outside the battery housing 2 into the corresponding through-opening 9 until the engagement elements 14 of the closure elements 10 snap into place in the recesses 15 of the inlet tube 6 and of the outlet tube 7.

LIST OF REFERENCE SIGNS

1 Battery housing assembly
2 Battery housing
3 Interior space
4 Lower shell

5 Heat transmission device
6 Inlet tube
7 Outlet tube
8 Heat exchanger element
9 Through-opening
10 Closure element
11 Inner ring element
12 Outer ring element
13 Connecting element
14 Engagement element, locking element
15 Recess, locking element
16 Sealing element
17 Annular groove
18 Sliding direction
19 Pivoting direction
20 Passage direction

The invention claimed is:

1. A battery housing assembly, in particular a battery housing assembly of a vehicle traction battery which can be temperature-controlled by a fluid, comprising a battery housing which encloses an interior space for receiving a plurality of battery cells; and a heat transmission device which has an inlet tube, an outlet tube and a heat exchanger element arranged fluidically therebetween, the fluid being able to flow through the heat transmission device from the inlet tube via the heat exchanger element to the outlet tube; it being possible for the heat exchanger element to be accommodated in the battery housing; and wherein the heat transmission device is designed as a unit with the inlet tube, the outlet tube and the heat exchanger element, the battery housing has at least one through-opening for feeding through the inlet tube and the outlet tube; the battery housing has at least one closure element which is inserted into the at least one through-opening and forms a closure between the inlet tube and/or the outlet tube and the at least one through-opening; and the at least one closure element is deformable in an axial direction relative to a passage direction of the inlet tube and/or the outlet tube.

2. The battery housing assembly according to claim 1, wherein the battery housing has a through-opening for jointly feeding through the inlet tube and the outlet tube; and the battery housing has a closure element which is inserted into the through-opening and forms a closure between the inlet tube and/or the outlet tube and the at least one through-opening.

3. The battery housing assembly according to claim 1, wherein the battery housing has a plurality of through-openings for feeding through the inlet tube and the outlet tube; and the battery housing has a plurality of closure elements which are inserted into one through-opening in each case and form a closure between the inlet tube and a through-opening and between the outlet tube and a through-opening.

4. The battery housing assembly according to claim 3, wherein the plurality of through-openings for feeding through the inlet tube and the outlet tube are arranged on one side of the battery housing; and the inlet tube and the outlet tube extend on the same side with respect to the heat exchanger element, such that the inlet tube and the outlet tube can be passed through the plurality of through-openings together.

5. The battery housing assembly claim 1, wherein the at least one through-opening is designed as a tubular through-opening; and the at least one closure element is designed as a cylindrical closure element.

6. The battery housing assembly claim 1, wherein the at least one closure element is designed as a plastically and/or elastically deformable closure element, the at least one closure element being deformable in the radial direction relative to a passage direction of the inlet tube and/or the outlet tube.

7. The battery housing assembly claim 1, wherein the at least one closure element has an inner ring element for resting on the inlet tube and/or the outlet tube and an outer ring element for resting on the through-opening; and the inner ring element and the outer ring element are connected to one another via an in particular V-shaped connecting element.

8. The battery housing assembly claim 1, wherein corresponding locking elements are formed on the at least one through-opening and the at least one closure element in order to lock the at least one closure element in the at least one through-opening; and/or corresponding locking elements are formed on the at least one closure element and the inlet tube and/or the outlet tube in order to lock the at least one closure element on the inlet tube and/or the outlet tube.

9. The battery housing assembly claim 1, wherein a sealing element is arranged between the at least one through-opening and the at least one closure element, and is preferably positioned in an annular groove of the closure element; and/or a sealing element is arranged between the at least one closure element and the inlet tube and/or the outlet tube, and is preferably positioned in an annular groove of the inlet tube and/or the outlet tube.

10. The battery housing assembly claim 1, wherein the battery housing is designed as a plastics housing.

11. The battery housing assembly claim 1, wherein the battery housing is designed in two parts with an upper shell and a lower shell, the at least one through-opening preferably being formed in the lower shell.

12. The battery housing assembly claim 1, wherein the heat transmission device is designed as a whole as a rigid unit.

13. The battery housing assembly claim 1, wherein the heat transmission device is made in one piece.

14. The traction battery which can be temperature-controlled by a fluid, comprising a battery housing assembly according to claim 1 and a plurality of battery cells which are received in the battery housing of the battery housing assembly.

15. A method for producing a battery housing assembly, in particular a battery housing assembly of a vehicle traction battery which can be temperature-controlled by a fluid, comprising the steps of providing a battery housing which encloses an interior space for receiving a plurality of battery cells; positioning a heat transmission device designed as a unit and which has an inlet tube, an outlet tube and a heat exchanger element arranged fluidically therebetween, the fluid being able to flow through the heat transmission device from the inlet tube via the heat exchanger element to the outlet tube, in the interior space of the battery housing; feeding the inlet tube and the outlet tube through at least one through-opening of the battery housing from inside the battery housing; and closing the battery housing by means of at least one closure element which forms a closure between the inlet tube and/or the outlet tube and the at least one through-opening, the at least one closure element being deformable in an axial direction relative to a passage direction of the inlet tube and/or the outlet tube.

16. The method according to claim 15, wherein closing the battery housing by means of at least one closure element includes sliding the at least one closure element onto the inlet tube and/or the outlet tube and inserting the at least one closure element into the at least one through-opening from outside the battery housing.

17. The method according to claim 15, wherein feeding the inlet tube and the outlet tube through the at least one through-opening from inside the battery housing includes adjusting the heat transmission device such that the inlet tube and the outlet tube are arranged at an angle to a passage direction of the at least one through-opening, and pivoting the heat transmission device into its end position, the inlet tube and the outlet tube in the end position being arranged parallel to the passage direction in the at least one through-opening.

18. The battery housing assembly claim 1, wherein the at least one closure element comprises rubber plastic material including polypropylene (PP), ethylene-propylene-diene monomer (EPDM) or a combination thereof.

19. The battery housing assembly claim 7, wherein the at least one closure element comprises two-component injection-molded components wherein the inner and outer ring elements have a higher strength than the connecting element.

\* \* \* \* \*